US012563003B2

(12) United States Patent
Lee et al.

(10) Patent No.: US 12,563,003 B2
(45) Date of Patent: Feb. 24, 2026

(54) DELETION BY ANALYZING KEYWORDS AND SEMANTIC SITUATIONS

(71) Applicant: Samsung Electronics Co., Ltd., Suwon-si (KR)

(72) Inventors: Hungyi Lee, Seattle, WA (US); Ziyi Yang, Bellevue, WA (US); Mi Yeoung Chung, Seoul (KR); Myoung Woo Nam, Yongin-si (KR); Kyongho Kim, Sammamish, WA (US); Li-Hui Chu, Seattle, WA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/731,559

(22) Filed: Jun. 3, 2024

(65) Prior Publication Data

US 2025/0373577 A1      Dec. 4, 2025

(51) Int. Cl.
| | |
|---|---|
| *H04L 51/046* | (2022.01) |
| *G06F 40/35* | (2020.01) |
| *H04L 51/42* | (2022.01) |

(52) U.S. Cl.
CPC ............ *H04L 51/046* (2013.01); *G06F 40/35* (2020.01); *H04L 51/42* (2022.05)

(58) Field of Classification Search
CPC ........ H04L 51/046; H04L 51/42; G06F 40/35
USPC ................................ 709/226, 223, 224, 206
See application file for complete search history.

(56) References Cited

U.S. PATENT DOCUMENTS

| | | | |
|---|---|---|---|
| 8,086,672 B2 | 12/2011 | Horvitz | |
| 9,614,804 B2 | 4/2017 | Myles | |
| 9,898,162 B2 | 2/2018 | Jisrawi et al. | |
| 10,798,041 B2 * | 10/2020 | Bendi | H04L 51/18 |
| 11,652,768 B2 | 5/2023 | Zhao | |
| 11,855,941 B2 | 12/2023 | Bhagwan et al. | |
| 2018/0352587 A1 * | 12/2018 | Pollack | H04L 69/16 |
| 2020/0120050 A1 * | 4/2020 | Jung | H04L 51/216 |
| 2023/0294002 A1 * | 9/2023 | Salazar | A63F 13/79 |
| | | | 463/29 |

FOREIGN PATENT DOCUMENTS

| | | | |
|---|---|---|---|
| KR | 20070068517 A | * | 7/2007 |
| KR | 20140094893 A | | 7/2014 |

* cited by examiner

*Primary Examiner* — Liang Che A Wang

(57) ABSTRACT

A received message is classified as originating from a person or from an application. For a message originated from a person, a machine learning model is used to semantically analyze content of the message for a timeout for the message or an action corresponding to the message. For a message originated from an application, either a message characteristic is used to determine the timeout for the message, or the machine learning model is used to semantically analyze content of the message for the timeout for the message or the action corresponding to the message. When the timeout has elapsed or the action corresponding to the message has been completed, the message is marked for automatic deletion following a period of N days. Management of time-sensitive messages and communication efficiency are improved.

20 Claims, 9 Drawing Sheets

200

ELECTRONIC DEVICE                                          101

206

MESSAGE
APP

208

OTHER
APP(S)

202

SEMANTIC
ANALYSIS
MODEL(s)

120

PROCESSOR

210

OTHER
APP(S)

212

DISPLAY

204

OTHER
MODEL(S)

[Sender] a friend
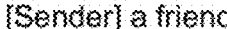
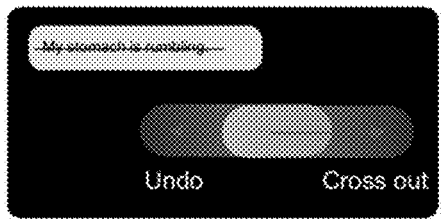
FIGURE 7A
[Sender] AA Bank
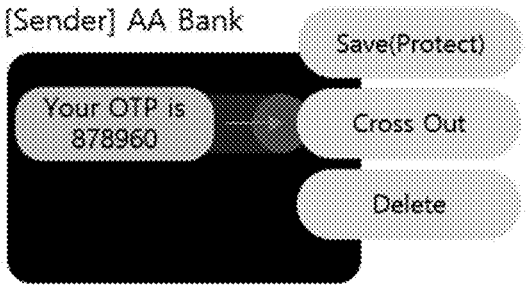
FIGURE 7B

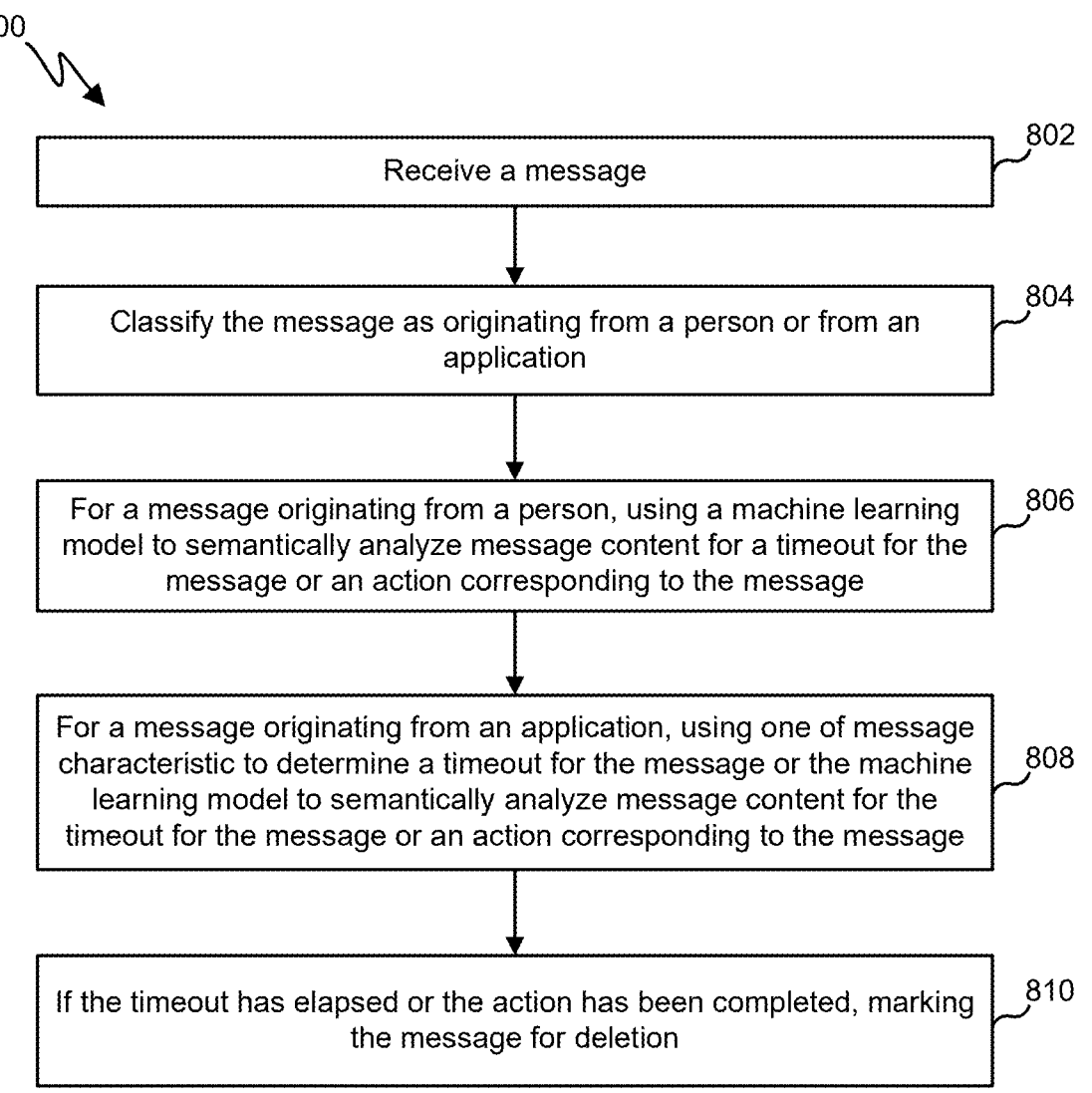

800

Receive a message 802

Classify the message as originating from a person or from an application 804

For a message originating from a person, using a machine learning model to semantically analyze message content for a timeout for the message or an action corresponding to the message 806

For a message originating from an application, using one of message characteristic to determine a timeout for the message or the machine learning model to semantically analyze message content for the timeout for the message or an action corresponding to the message 808

If the timeout has elapsed or the action has been completed, marking the message for deletion 810

| | |
|---|---|
| Select pre-trained machine learning model(s) | 902 |

| | |
|---|---|
| Fine-tune model(s) using unlabeled data. | 904 |

| | |
|---|---|
| Super fine-tune model(s) using labeled data. | 906 |

| | |
|---|---|
| Derive action to be performed | 908 |

DELETION BY ANALYZING KEYWORDS AND SEMANTIC SITUATIONS

TECHNICAL FIELD

This disclosure relates generally to electronic devices that send and receive messages containing text and images, particularly through wireless communications. More specifically, this disclosure relates to automated marking of messages for deletion and message deletion.

BACKGROUND

In daily communication, there are many time-sensitive messages that people may easily miss or that require additional confirmation or explanation, where missing or not responding to the message leads to inefficient communication. Also, during text communication on a smart device (e.g., short message service or "SMS"), situations arise in which messages are unnecessarily retained and stored after the period of time during which the message content is relevant. An example is multi-factor authentication (MFA) one-time password (OTP) security codes that become invalid after a period of (for example) 10 minutes.

SUMMARY

This disclosure relates to managing messages within electronic devices.

In a first embodiment, a method includes receiving a message and classifying the message as originating from a person or from an application. Based on determining that the message originated from a person, a machine learning model is used to semantically analyze content of the message for a timeout for the message or an action corresponding to the message. Based on determining that the message originated from an application, either a message characteristic is used to determine the timeout for the message, or the machine learning model is used to semantically analyze content of the message for the timeout for the message or the action corresponding to the message. Responsive to determining that the timeout has elapsed or the action corresponding to the message has been completed, the message is marked for deletion following a predetermined period.

In a second embodiment, an electronic device includes a transceiver configured to receive a message and a process configured to classify the message as originating from a person or from an application. The processor is configured, based on determining that the message originated from a person, to utilize a machine learning model to semantically analyze content of the message for a timeout for the message or an action corresponding to the message. The processor is configured, based on determining that the message originated from an application, to either use a message characteristic to determine the timeout for the message, or use the machine learning model to semantically analyze content of the message for the timeout for the message or the action corresponding to the message. The process is configured, responsive to determining that the timeout has elapsed or the action corresponding to the message has been completed, to mark the message for deletion following a predetermined period.

In a third embodiment, a non-transitory machine readable medium contains instructions that when executed cause at least one processor of an electronic device to receive a message and classify the message as originating from a person or from an application. The instructions also cause at least one processor, based on determining that the message originated from a person, to utilize a machine learning model to semantically analyze content of the message for a timeout for the message or an action corresponding to the message. The instructions also cause at least one processor, based on determining that the message originated from an application, to either use a message characteristic to determine the timeout for the message, or use the machine learning model to semantically analyze content of the message for the timeout for the message or the action corresponding to the message. The instructions also cause at least one processor, responsive to determining that the timeout has elapsed or the action corresponding to the message has been completed, to mark the message for automated deletion following a predetermined period.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

As used here, terms and phrases such as "have," "may have," "include," or "may include" a feature (like a number, function, operation, or component such as a part) indicate the existence of the feature and do not exclude the existence of other features. Also, as used here, the phrases "A or B," "at least one of A and/or B," or "one or more of A and/or B" may include all possible combinations of A and B. For example, "A or B," "at least one of A and B," and "at least one of A or B" may indicate all of (1) including at least one A, (2) including at least one B, or (3) including at least one A and at least one B. Further, as used here, the terms "first" and "second" may modify various components regardless of importance and do not limit the components. These terms are only used to distinguish one component from another. For example, a first user device and a second user device may indicate different user devices from each other, regardless of the order or importance of the devices. A first component may be denoted a second component and vice versa without departing from the scope of this disclosure.

It will be understood that, when an element (such as a first element) is referred to as being (operatively or communicatively) "coupled with/to" or "connected with/to" another element (such as a second element), it can be coupled or connected with/to the other element directly or via a third element. In contrast, it will be understood that, when an element (such as a first element) is referred to as being "directly coupled with/to" or "directly connected with/to" another element (such as a second element), no other element (such as a third element) intervenes between the element and the other element.

As used here, the phrase "configured (or set) to" may be interchangeably used with the phrases "suitable for," "having the capacity to," "designed to," "adapted to," "made to," or "capable of" depending on the circumstances. The phrase "configured (or set) to" does not essentially mean "specifically designed in hardware to." Rather, the phrase "configured to" may mean that a device can perform an operation together with another device or parts. For example, the phrase "processor configured (or set) to perform A, B, and C" may mean a generic-purpose processor (such as a CPU or application processor) that may perform the operations by executing one or more software programs stored in a memory device or a dedicated processor (such as an embedded processor) for performing the operations.

The terms and phrases as used here are provided merely to describe some embodiments of this disclosure but not to limit the scope of other embodiments of this disclosure. It is to be understood that the singular forms "a," "an," and "the" include plural references unless the context clearly dictates otherwise. All terms and phrases, including technical and scientific terms and phrases, used here have the same meanings as commonly understood by one of ordinary skill in the art to which the embodiments of this disclosure belong. It will be further understood that terms and phrases, such as those defined in commonly-used dictionaries, should be interpreted as having a meaning that is consistent with their meaning in the context of the relevant art and will not be interpreted in an idealized or overly formal sense unless expressly so defined here. In some cases, the terms and phrases defined here may be interpreted to exclude embodiments of this disclosure.

Examples of an "electronic device" according to embodiments of this disclosure may include at least one of a smartphone, a tablet personal computer (PC), a mobile phone, a video phone, an e-book reader, a desktop PC, a laptop computer, a netbook computer, a workstation, a personal digital assistant (PDA), a portable multimedia player (PMP), an MP3 player, a mobile medical device, a camera, or a wearable device (such as smart glasses, a head-mounted device (HMD), electronic clothes, an electronic bracelet, an electronic necklace, an electronic accessory, an electronic tattoo, a smart mirror, or a smart watch). Other examples of an electronic device include a smart home appliance. Examples of the smart home appliance may include at least one of a television, a digital video disc (DVD) player, an audio player, a refrigerator, an air conditioner, a cleaner, an oven, a microwave oven, a washer, a dryer, an air cleaner, a set-top box, a home automation control panel, a security control panel, a TV box (such as SAMSUNG HOMESYNC, APPLETV, or GOOGLE TV), a smart speaker or speaker with an integrated digital assistant (such as SAMSUNG GALAXY HOME, APPLE HOMEPOD, or AMAZON ECHO), a gaming console (such as an XBOX, PLAYSTATION, or NINTENDO), an electronic dictionary, an electronic key, a camcorder, or an electronic picture frame. Still other examples of an electronic device include at least one of various medical devices (such as diverse portable medical measuring devices (like a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global positioning system (GPS) receiver, an event data recorder (EDR), a flight data recorder (FDR), an automotive infotainment device, a sailing electronic device (such as a sailing navigation device or a gyro compass), avionics, security devices, vehicular head units, industrial or home robots, automatic teller machines (ATMs), point of sales (POS) devices, or Internet of Things (IoT) devices (such as a bulb, various sensors, electric or gas meter, sprinkler, fire alarm, thermostat, street light, toaster, fitness equipment, hot water tank, heater, or boiler). Other examples of an electronic device include at least one part of a piece of furniture or building/structure, an electronic board, an electronic signature receiving device, a projector, or various measurement devices (such as devices for measuring water, electricity, gas, or electromagnetic waves). Note that, according to various embodiments of this disclosure, an electronic device may be one or a combination of the above-listed devices. According to some embodiments of this disclosure, the electronic device may be a flexible electronic device. The electronic device disclosed here is not limited to the above-listed devices and may include new electronic devices depending on the development of technology.

In the following description, electronic devices are described with reference to the accompanying drawings, according to various embodiments of this disclosure. As used here, the term "user" may denote a human or another device (such as an artificial intelligent electronic device) using the electronic device.

Definitions for other certain words and phrases may be provided throughout this patent document. Those of ordinary skill in the art should understand that in many if not most instances, such definitions apply to prior as well as future uses of such defined words and phrases.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the Applicant to refer to structures known to those skilled in the relevant art and is not intended to invoke 35 U.S.C. § 112(f).

BRIEF DESCRIPTION OF THE DRAWINGS

For a more complete understanding of this disclosure and its advantages, reference is now made to the following description taken in conjunction with the accompanying drawings, in which like reference numerals represent like parts:

FIGS. 7A and 7B illustrate alternative user interface controls for manually deleting, protecting, or restoring messages in accordance with this disclosure;

FIG. 8 illustrates an example method for message marking and deletion in accordance with this disclosure.

DETAILED DESCRIPTION

Figure 1:
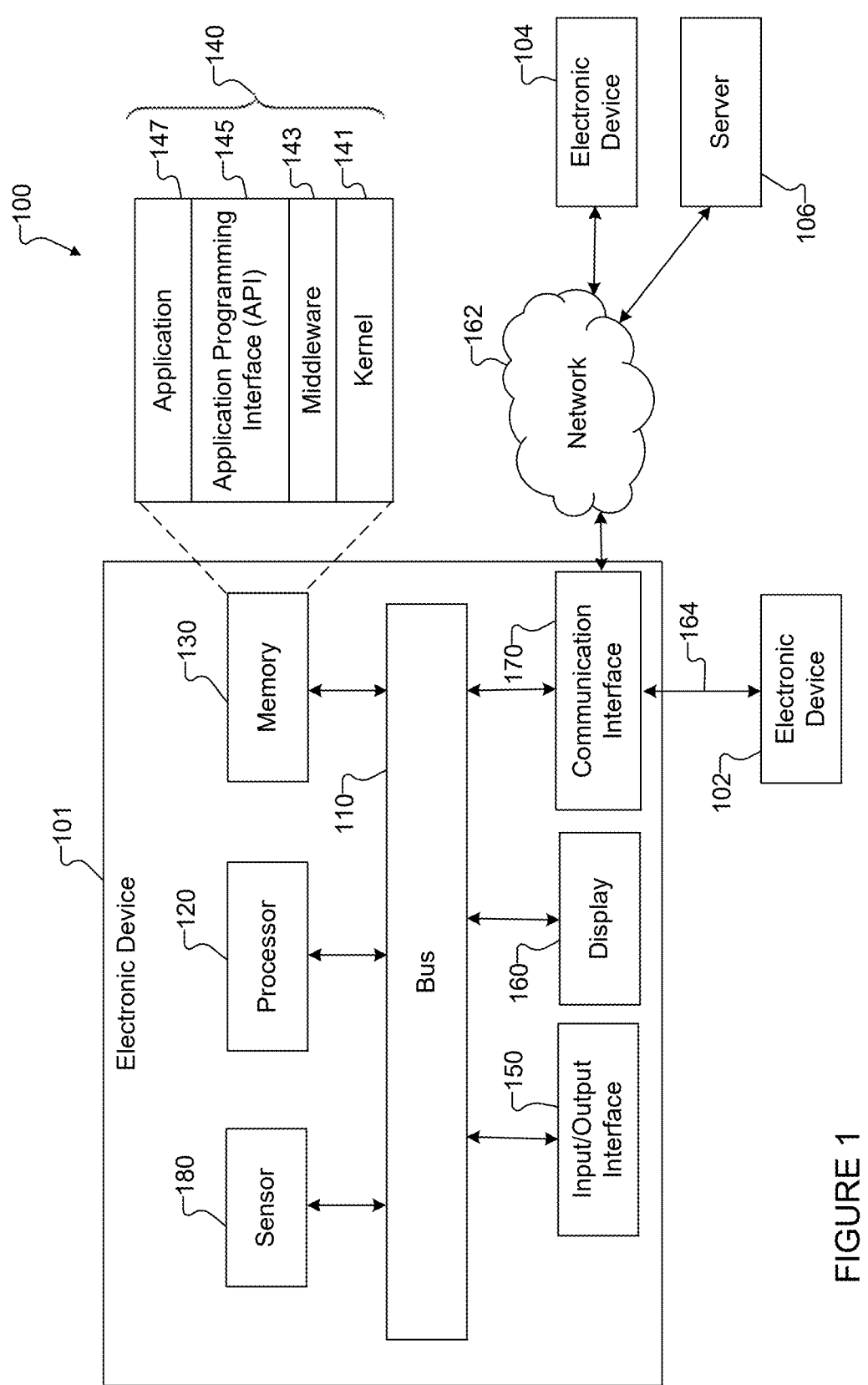
FIG. 1 illustrates an example network configuration including an electronic device in accordance with this disclosure.

FIGS. 1 through 9, discussed below, and the various embodiments of this disclosure are described with reference to the accompanying drawings. However, it should be appreciated that this disclosure is not limited to these embodiments, and all changes and/or equivalents or replacements thereto also belong to the scope of this disclosure. The same or similar reference denotations may be used to refer to the same or similar elements throughout the specification and the drawings.

As noted above, there are numerous messages in everyday communication that are time sensitive. However, users often overlook such messages, leading to inefficient communication, or fail to manage (e.g., delete) expired message, leading to unnecessary storage. Based on the present disclosure, users can more easily manage time-sensitive messages, improve communication efficiency, and smartly manage to-do lists.

This disclosure addresses issues with message management by analyzing keywords within the message and the user's situation to delete or mark for deletion (e.g., cross out) any completed or expired messages, helping users more smartly manage messages and tasks while improving the efficiency of the user's communication.

Among the numerous messages that a user receives, each message is firstly classified as application-to-person (A2P) or person-to-person (P2P). The message is then analyzed using a corresponding artificial intelligence (AI) or machine learning (ML) model. For A2P messages, the timeout period for the message can often be easily identified from the message content. For example, one-time password messages may indicate the period of validity for the security code therein; if not, the security code will normally expire in 10 minutes. If the timeout for an A2P message cannot be easily identified (e.g., a message regarding delivery tracking), semantic analysis will be run to attempt to determine the timeout. Once the message expires, the message will be automatically crossed out.

On the other hand, expiration of P2P messages can often be identified based on the actions involved. Semantic analysis may be used to comprehend the sender's intention and the desired action that the receiver is anticipated to undertake. After identifying the actions that need to be checked, which may be stored in a database, a monitor module checks whether these actions have been or are being performed by the receiver. For example, a message reading "call me back" involves a straightforward action: initiating a phone call. The device can track whether a successful outgoing call was placed, to a number matching the message sender's phone number. However, if the P2P message involves implicit actions or complicated contents (e.g., "My stomach is rumbling"), users are allowed to manually cross out the message.

If the message expires or message-related actions are performed, the message will be automatically/manually crossed out. The crossed out state of the message may be applied to both messages from the sender and related replied by the receiver. After a period of N days, the crossed out message(s) will be deleted.

Note that while some of the embodiments discussed below are described in the context of use in consumer electronic devices (such as smartphones), this is merely one example. It will be understood that the principles of this disclosure may be implemented in any number of other suitable contexts and may use any suitable device or devices. Also note that while some of the embodiments discussed below are described based on the assumption that one device (such as a server) performs training of a machine learning model that is deployed to one or more other devices (such as one or more consumer electronic devices), this is also merely one example. It will be understood that the principles of this disclosure may be implemented using any number of devices, including a single device that both trains and uses a machine learning model. In general, this disclosure is not limited to use with any specific type(s) of device(s).

FIG. 1 illustrates an example network configuration 100 including an electronic device within which message management may be implemented in accordance with this disclosure. The embodiment of the network configuration 100 shown in FIG. 1 is for illustration only. Other embodiments of the network configuration 100 could be used without departing from the scope of this disclosure.

According to embodiments of this disclosure, an electronic device 101 is included in the network configuration 100. The electronic device 101 can include at least one of a bus 110, a processor 120, a memory 130, an input/output (I/O) interface 150, a display 160, a communication interface 170, or a sensor 180. In some embodiments, the electronic device 101 may exclude at least one of these components or may add at least one other component. The bus 110 includes a circuit for connecting the components 120-180 with one another and for transferring communications (such as control messages and/or data) between the components.

The processor 120 includes one or more processing devices, such as one or more microprocessors, microcontrollers, digital signal processors (DSPs), application specific integrated circuits (ASICs), or field programmable gate arrays (FPGAs). In some embodiments, the processor 120 includes one or more of a central processing unit (CPU), an application processor (AP), a communication processor (CP), or a graphics processor unit (GPU). The processor 120 is able to perform control on at least one of the other components of the electronic device 101 and/or perform an operation or data processing relating to communication or other functions. As described in more detail below, the processor 120 may perform various operations related to automated marking of messages for deletion and message deletion. The processor 120 may further instruct other devices to perform certain operations (such as outputting audio using an audio output device like a speaker) or display content on one or more displays 160. In addition, the processor 120 may receive inputs (such as data samples to be used in training machine learning models) and manage such training by inputting the samples to the machine learning models, receive outputs from the machine learning models, and execute learning functions (such as loss functions) to improve the machine learning models.

The memory 130 can include a volatile and/or non-volatile memory. For example, the memory 130 can store commands or data related to at least one other component of the electronic device 101. According to embodiments of this disclosure, the memory 130 can store software and/or a program 140. The program 140 includes, for example, a kernel 141, middleware 143, an application programming interface (API) 145, and/or an application program (or "application") 147. At least a portion of the kernel 141, middleware 143, or API 145 may be denoted an operating system (OS).

The kernel 141 can control or manage system resources (such as the bus 110, processor 120, or memory 130) used to perform operations or functions implemented in other programs (such as the middleware 143, API 145, or application 147). The kernel 141 provides an interface that allows the middleware 143, the API 145, or the application 147 to access the individual components of the electronic device 101 to control or manage the system resources. The application 147 may support various functions related to automated marking of messages for deletion and message deletion. These functions can be performed by a single application or by multiple applications that each carries out one or more of these functions. The middleware 143 can function as a relay to allow the API 145 or the application 147 to communicate data with the kernel 141, for instance. A plurality of applications 147 can be provided. The middleware 143 is able to control work requests received from the applications 147, such as by allocating the priority of using the system resources of the electronic device 101 (like the bus 110, the processor 120, or the memory 130) to at least one of the plurality of applications 147. The API 145 is an interface allowing the application 147 to control functions provided from the kernel 141 or the middleware 143. For example, the API 145 includes at least one interface or function (such as a command) for filing control, window control, image processing, or text control.

The I/O interface 150 serves as an interface that can, for example, transfer commands or data input from a user or other external devices to other component(s) of the electronic device 101. The I/O interface 150 can also output commands or data received from other component(s) of the electronic device 101 to the user or the other external device.

The display 160 includes, for example, a liquid crystal display (LCD), a light emitting diode (LED) display, an organic light emitting diode (OLED) display, a quantum-dot light emitting diode (QLED) display, a microelectromechanical systems (MEMS) display, or an electronic paper display. The display 160 can also be a depth-aware display, such as a multi-focal display. The display 160 is able to display, for example, various contents (such as text, images, videos, icons, or symbols) to the user. The display 160 can include a touchscreen and may receive, for example, a touch, gesture, proximity, or hovering input using an electronic pen or a body portion of the user.

The communication interface 170, for example, is able to set up communication between the electronic device 101 and an external electronic device (such as a first electronic device 102, a second electronic device 104, or a server 106). For example, the communication interface 170 can be connected with a network 162 or 164 through wireless or wired communication to communicate with the external electronic device. The communication interface 170 can be a wired or wireless transceiver or any other component for transmitting and receiving signals.

The wireless communication is able to use at least one of, for example, WiFi, long term evolution (LTE), long term evolution-advanced (LTE-A), 5th generation wireless system (5G), millimeter-wave or 60 GHz wireless communication, Wireless USB, code division multiple access (CDMA), wideband code division multiple access (WCDMA), universal mobile telecommunication system (UMTS), wireless broadband (WiBro), or global system for mobile communication (GSM), as a communication protocol. The wired connection can include, for example, at least one of a universal serial bus (USB), high definition multimedia interface (HDMI), recommended standard 232 (RS-232), or plain old telephone service (POTS). The network 162 or 164 includes at least one communication network, such as a computer network (like a local area network (LAN) or wide area network (WAN)), Internet, or a telephone network.

The electronic device 101 further includes one or more sensors 180 that can meter a physical quantity or detect an activation state of the electronic device 101 and convert metered or detected information into an electrical signal. For example, one or more sensors 180 can include one or more cameras or other imaging sensors for capturing images of scenes. The sensor(s) 180 can also include one or more buttons for touch input, one or more microphones, a gesture sensor, a gyroscope or gyro sensor, an air pressure sensor, a magnetic sensor or magnetometer, an acceleration sensor or accelerometer, a grip sensor, a proximity sensor, a color sensor (such as an RGB sensor), a bio-physical sensor, a temperature sensor, a humidity sensor, an illumination sensor, an ultraviolet (UV) sensor, an electromyography (EMG) sensor, an electroencephalogram (EEG) sensor, an electrocardiogram (ECG) sensor, an infrared (IR) sensor, an ultrasound sensor, an iris sensor, or a fingerprint sensor. The sensor(s) 180 can further include an inertial measurement unit, which can include one or more accelerometers, gyroscopes, and other components. In addition, the sensor(s) 180 can include a control circuit for controlling at least one of the sensors included here. Any of these sensor(s) 180 can be located within the electronic device 101.

In some embodiments, the first external electronic device 102 or the second external electronic device 104 can be a wearable device or an electronic device-mountable wearable device (such as an HMD). When the electronic device 101 is mounted in the electronic device 102 (such as the HMD), the electronic device 101 can communicate with the electronic device 102 through the communication interface 170. The electronic device 101 can be directly connected with the electronic device 102 to communicate with the electronic device 102 without involving with a separate network. The electronic device 101 can also be an augmented reality wearable device, such as eyeglasses, which include one or more imaging sensors.

The first and second external electronic devices 102 and 104 and the server 106 each can be a device of the same or a different type from the electronic device 101. According to certain embodiments of this disclosure, the server 106 includes a group of one or more servers. Also, according to certain embodiments of this disclosure, all or some of the operations executed on the electronic device 101 can be executed on another or multiple other electronic devices (such as the electronic devices 102 and 104 or server 106). Further, according to certain embodiments of this disclosure, when the electronic device 101 should perform some function or service automatically or at a request, the electronic device 101, instead of executing the function or service on its own or additionally, can request another device (such as electronic devices 102 and 104 or server 106) to perform at least some functions associated therewith. The other electronic device (such as electronic devices 102 and 104 or server 106) is able to execute the requested functions or additional functions and transfer a result of the execution to the electronic device 101. The electronic device 101 can provide a requested function or service by processing the received result as it is or additionally. To that end, a cloud computing, distributed computing, or client-server computing technique may be used, for example. While FIG. 1 shows that the electronic device 101 includes the communication interface 170 to communicate with the external electronic device 104 or server 106 via the network 162 or 164, the electronic device 101 may be independently operated without a separate communication function according to some embodiments of this disclosure.

The server 106 can include the same or similar components 110-180 as the electronic device 101 (or a suitable subset thereof). The server 106 can support to drive the electronic device 101 by performing at least one of operations (or functions) implemented on the electronic device 101. For example, the server 106 can include a processing module or processor that may support the processor 120 implemented in the electronic device 101. As described in more detail below, the server 106 may perform various operations related to automated marking of messages for deletion and message deletion. The server 106 may further instruct other devices to perform certain operations (such as outputting audio using an audio output device like a speaker) or display content on one or more displays 160. In addition, the server 106 may receive inputs (such as data samples to be used in training machine learning models) and manage such training by inputting the samples to the machine learning models, receive outputs from the machine learning models, and execute learning functions (such as loss functions) to improve the machine learning models.

Although FIG. 1 illustrates one example of a network configuration 100 including an electronic device 101, various changes may be made to FIG. 1. For example, the network configuration 100 could include any number of each component in any suitable arrangement. In general, computing and communication systems come in a wide variety of configurations, and FIG. 1 does not limit the scope of this disclosure to any particular configuration. Also, while FIG. 1 illustrates one operational environment in which various features disclosed in this patent document can be used, these features could be used in any other suitable system.

Figure 2:
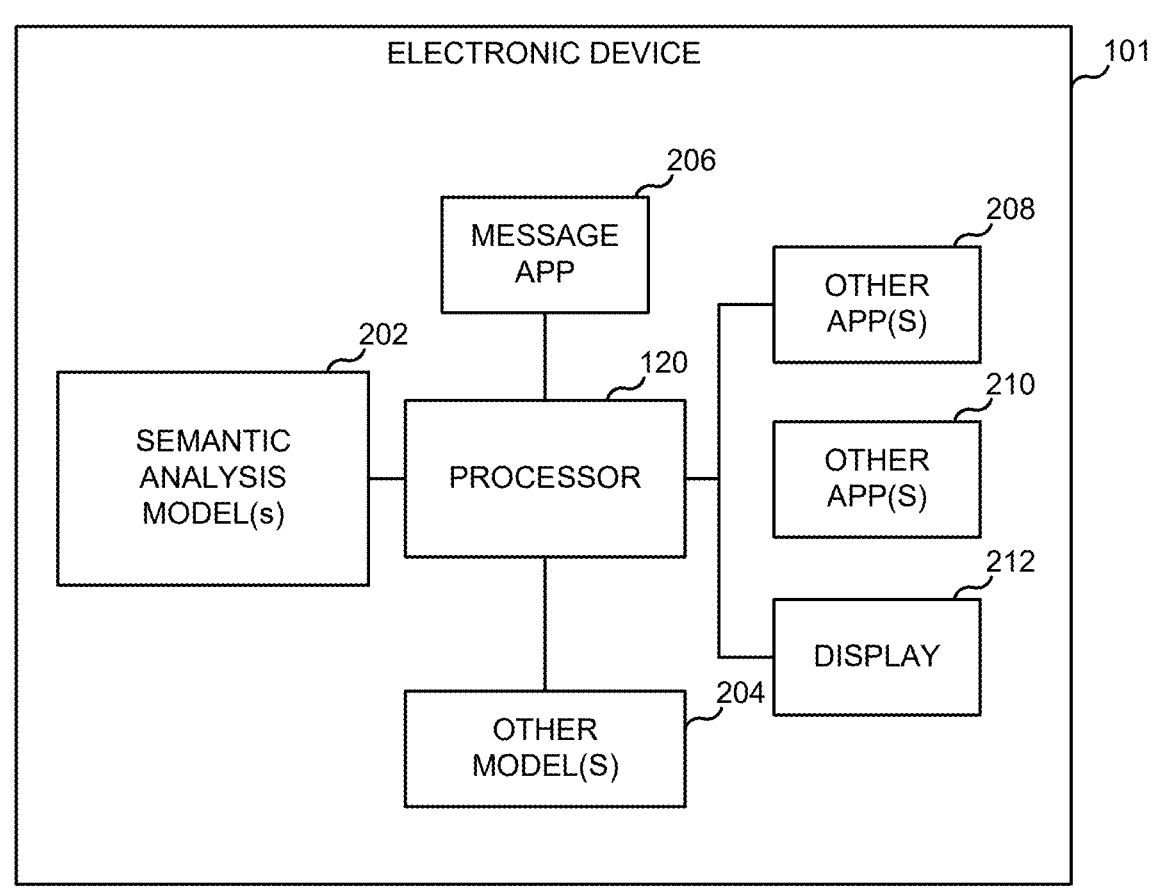
FIG. 2 illustrates an example language model system in accordance with this disclosure.

FIG. 2 illustrates an example machine learning model system 200 in accordance with this disclosure. For ease of explanation, the system 200 is described as involving the use of the electronic device 101 in the network configuration 100 of FIG. 1. However, the system 200 may be used with any other suitable electronic device(s), such as the server 106, and in any other suitable system(s).

As shown in FIG. 2, the system 200 includes the electronic device 101, which includes the processor 120. The processor 120 is operatively coupled to or otherwise configured to use one or more machine learning models, such as a trained and compressed semantic analysis model 202. As described in this disclosure, the trained and compressed semantic analysis model 202 can be a transformer-based language model that is compressed, combined with one or more semantic analysis algorithms that perform: word sense disambiguation; rule-based analysis such as named entity recognition, part-of-speech tagging, and creation of syntax trees; statistical analysis based on word embeddings or distributional semantics; neural networks (NN) and deep learning (DL) tasks such as semantic role labeling; and combinations of rule-based and statistical or neural methods. The trained and compressed semantic analysis model 202 can be based on one or more large language models. The selection and training of machine learning models is described in further detail below. It will be understood that more than one trained and compressed semantic analysis model 202 can be used by the electronic device 101.

The processor 120 can also be operatively coupled to or otherwise configured to use one or more other machine learning models 204, such as one or more virtual assistant-related models, one or more automatic speech recognition (ASR) models, and/or one or more natural language understanding (NLU) models. It will be understood that the machine learning models 202 and 204 can be stored in a memory of the electronic device 101 (such as the memory 130) and accessed by the processor 120 to perform various tasks such as automated speech recognition and related task performance. However, the machine learning models 202 and 204 can be stored in any other suitable manner.

The system 200 also includes a messaging app 206, other apps 208, 210 (such as a payment app or a memo app), and a display 212 (such as a screen or a monitor like the display 160). These other components can be used for message management by the electronic device 101. For example, the processor 120 can receive content within a message from the messaging app 206 and provide some or all of that content to the trained and compressed semantic analysis model 202. In some embodiments, the trained and compressed semantic analysis model 202 generates inferences regarding expiration of the message and outputs the result to the processor 120. In various embodiments, another trained and compressed semantic analysis model 202 can be used to convert the message content to a user intention and output a result to the processor 120, such as one or more outputs that are used to instruct further action by the electronic device 101.

Although FIG. 2 illustrates one example of a machine learning model system 200, various changes may be made to FIG. 2. Here, the electronic device 101 can transmit requests including inputs (such as message content) to the server 106 for processing of the inputs using the machine learning models, and the results can be sent back to the electronic device 101. In addition, in some embodiments, the electronic device 101 can be replaced by the server 106, which receives inputs from a client device and transmits instructions back to the client device to execute functions associated with instructions included in the inputs.

Figure 3A:
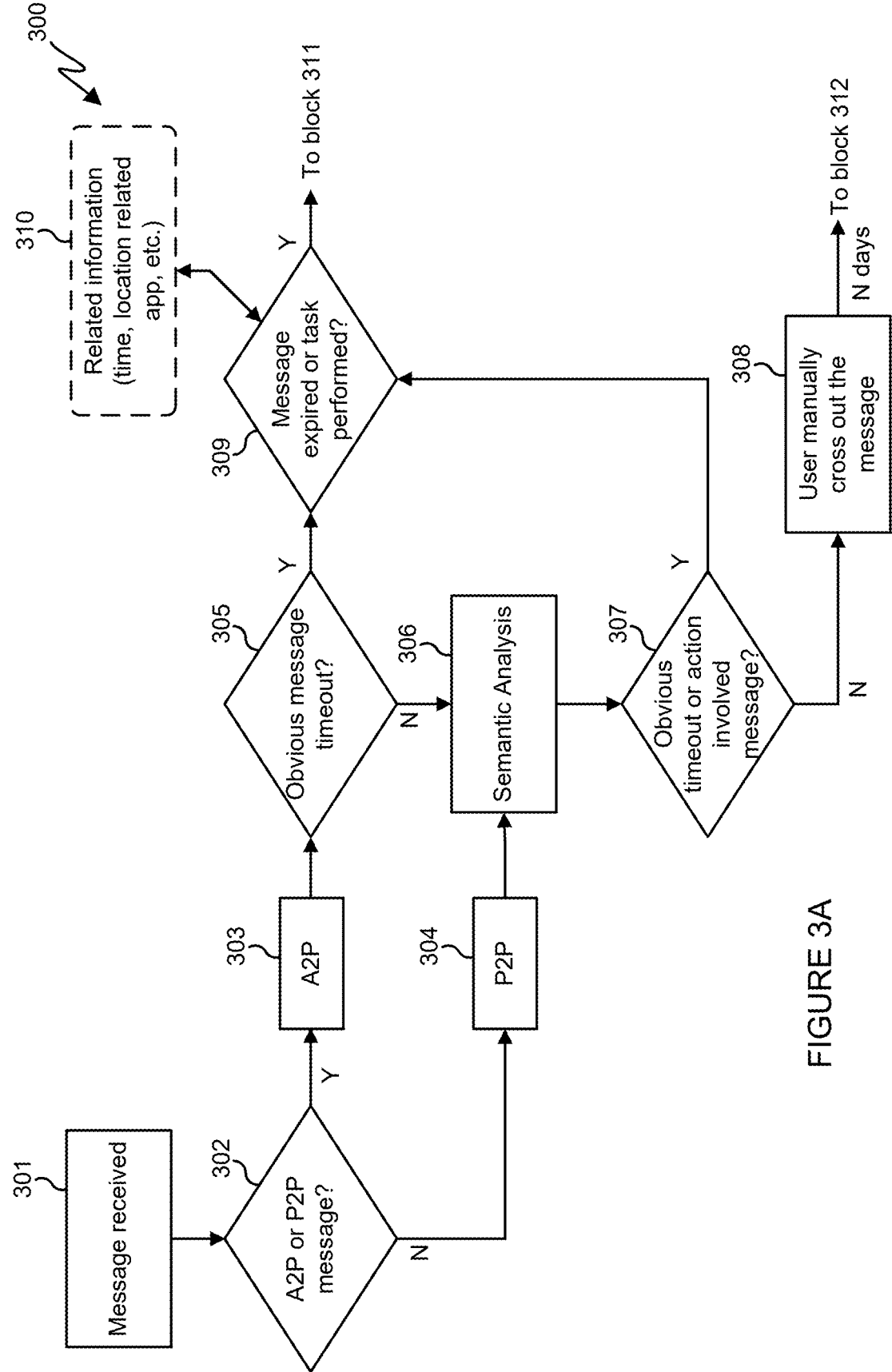
FIGS. 3A and 3B illustrate an example message marking and deletion process 300 in accordance with this disclosure.
Figures 3B, 4:
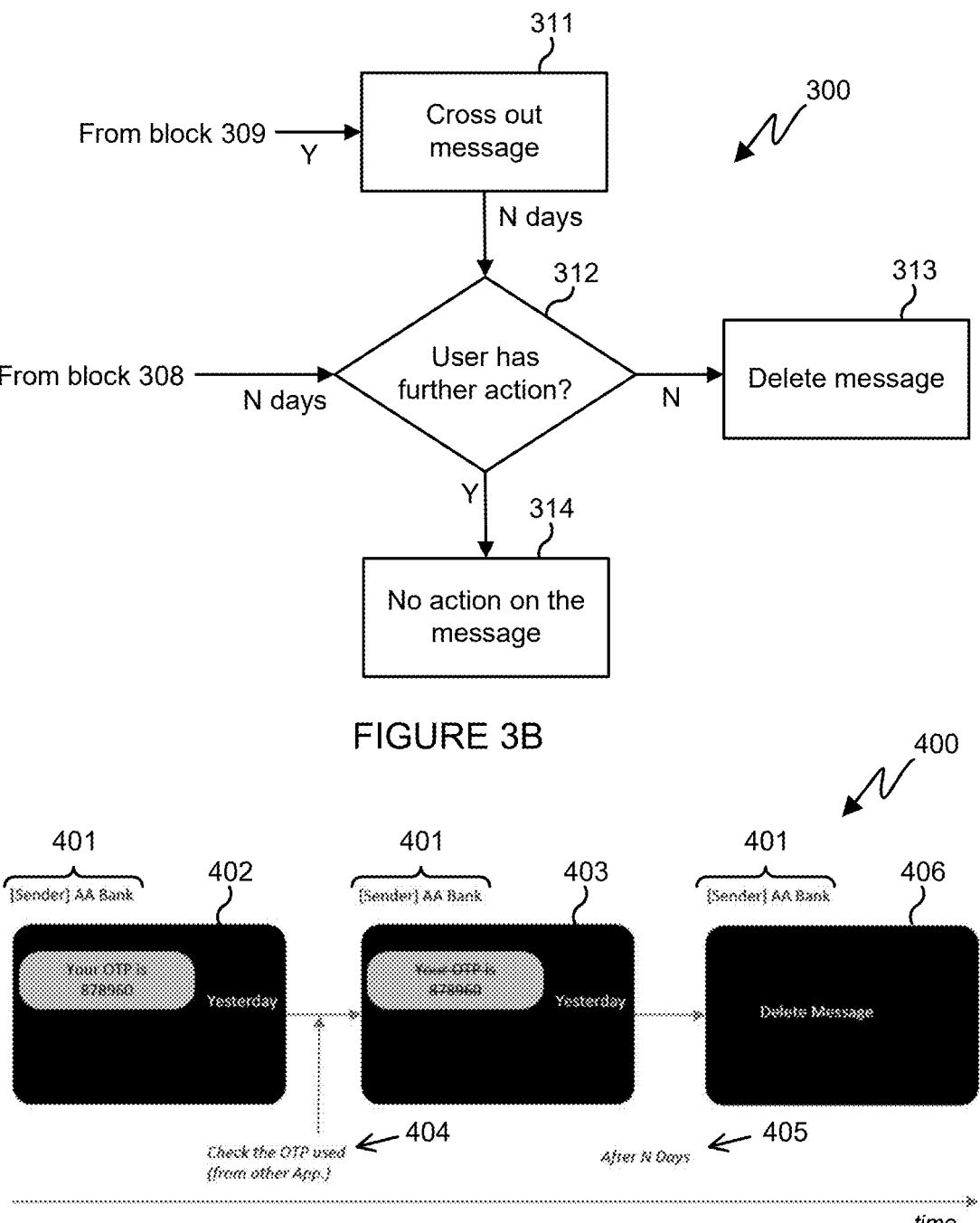
FIG. 4 is a series of user interface displays in accordance with this disclosure.

FIGS. 3A and 3B illustrates an example message marking and deletion process 300 in accordance with this disclosure. For ease of explanation, the process 300 is described as involving the use of the electronic device 101 in the network configuration 100 of FIG. 1. However, the process 300 may be used with any other suitable electronic device (such as the server 106) or a combination of devices (such as the electronic device 101 and the server 106) and in any other suitable system(s).

As illustrated in FIG. 3, the process 300 begins with receipt (block 301) of a message. A determination 302 is made of whether the received message is an A2P message or a P2P message, and either an A2P classification label 303 or a P2P classification label 304 may optionally be associated with the message for subsequent processing. The determination 302 may be made, for example, based on the number from which the received message was sent. Once the message is identified as an A2P message or a P2P message, the corresponding machine language model and/or logic is utilized.

For an A2P message, a determination 305 is made as to whether an obvious message timeout can be identified based on a characteristic (other than content) of the message. For example, multi-factor authentication A2P messages from a bank or other financial institution convey a one-time password that has an associated timeout period. In such instances, the origin of the A2P message (from a multi-factor authentication server) is associated with a predefined timeout period (e.g., 10 minutes), such that an obvious message timeout period can be determined from the origin of the message. Resort to semantic analysis of the message content may not be necessary in such cases. On the other hand, if no obvious message timeout can be identified from characteristics of the message in determination 305, a semantic analysis 306 is performed on the content of the A2P message. Similarly, for a P2P message, semantic analysis 306 is performed on the message content. The semantic analysis of message content seeks to infer, from the content, a timeout period or a corresponding action for expiration of the A2P or P2P message.

Semantic analysis 306 of the A2P or P2P message content (performed, for example, by semantic analysis model 202) checks the message for direct information regarding message expiration. For example, a delivery tracking A2P message may include a projected delivery date within the message content. Semantic analysis of the message content can identify the projected delivery date, which may be used for message expiration (absent subsequent A2P messages from the same sender updating the projected delivery). As an example of semantic analysis of a P2P message, the message may request an action by the recipient, such as a callback, a payment, or a task. For both types of messages, inferences resulting from the semantic analysis 306 are used for a determination 307 of whether a date (or time) or an action is indicated in the message content. For instance, the projected delivery date described above may be used to set a time for message expiration, or the requested action may be used to identify a trigger for message expiration. However, if no time or action is implicated by the message content, the user is allowed to manually cross out the message (block 308).

If an obvious message timeout is identified from message characteristics (other than content) by the determination 305, or the semantic analysis 306 of the message content and corresponding determination 307 identifies a time or an action implicated by the message content, a determination 309 is made as to whether the message is no longer needed. The determination 309 may involve checking related information 310 regarding the user's situation (time, related app information, etc.), which is acquired and checked to confirm that the message is no longer needed—that is, that the expiration period for the message has elapsed or an action implicated by the message has been completed. If the message is no longer needed, the message is automatically crossed out by the electronic device 101 (block 311), without any need for further user action. Specific examples of how related information 310 may be employed in determining that the message is no longer needed are provided below.

Messages that are manually crossed out by the user (block 308) or automatically crossed out by the electronic device 101 (block 311) are retained in the active messages for a period of N days. If there is no further action to be completed by the user on a crossed-out message after N days (determination 312), the message will be deleted (moved to the trash) (block 313). If there is further action to be completed by the user on a crossed-out message after N days, the message is not deleted (block 314).

In the example of FIGS. 3A and 3B, expired messages are described as crossed out. However, alternative visual indications of an expired message may be utilized, such as a small text "expired" below (or otherwise associated with) the message, or by greying out the message bubble, message text, or both. In like manner, for messages involving an action or to-do task, once the electronic device 101 detects completion of the action (e.g., through related information 310 from other apps), the message may be marked with a small text "Task completed," or a check mark associated with the message, as a visual indication.

Although FIGS. 3A and 3B illustrate one example message management process 300, various changes may be made to FIGS. 3A and 3B. For example, while shown as a series of steps, various steps in FIGS. 3A and 3B could overlap, occur in parallel, occur in a different order, or occur any number of times (including zero times).

FIG. 4 is a series 400 of user interface displays illustrating results of performance by the electronic device 101 of the determinations 302, 305, 309, and 312 and actions 311 and 313 in FIGS. 3A and 3B. FIG. 4 is an example of an obviously time-sensitive A2P message, containing a validation code with an associated expiration period. In the example of FIG. 4, an A2P message (as classified by determination 302) is received with sender information 401 indicating that the message originated from a third-party app for a financial institution, and with message content 402 including a one-time password. Without considering the message content 402, a message expiration is associated (based on determination 305) with the message. After lapse of a period exceeding the explicit timeout for the one-time password (ascertained by determination 309), the message content 403 is displayed as crossed out. Optionally, related information 310 from the third-party app for the financial institution may also be checked to determine if the one-time password was used. The message implicitly requires no further action by the user (determination 312), so after elapse 405 of a period of N days, the message content 406 is deleted without further action by the user.

Figure 5:
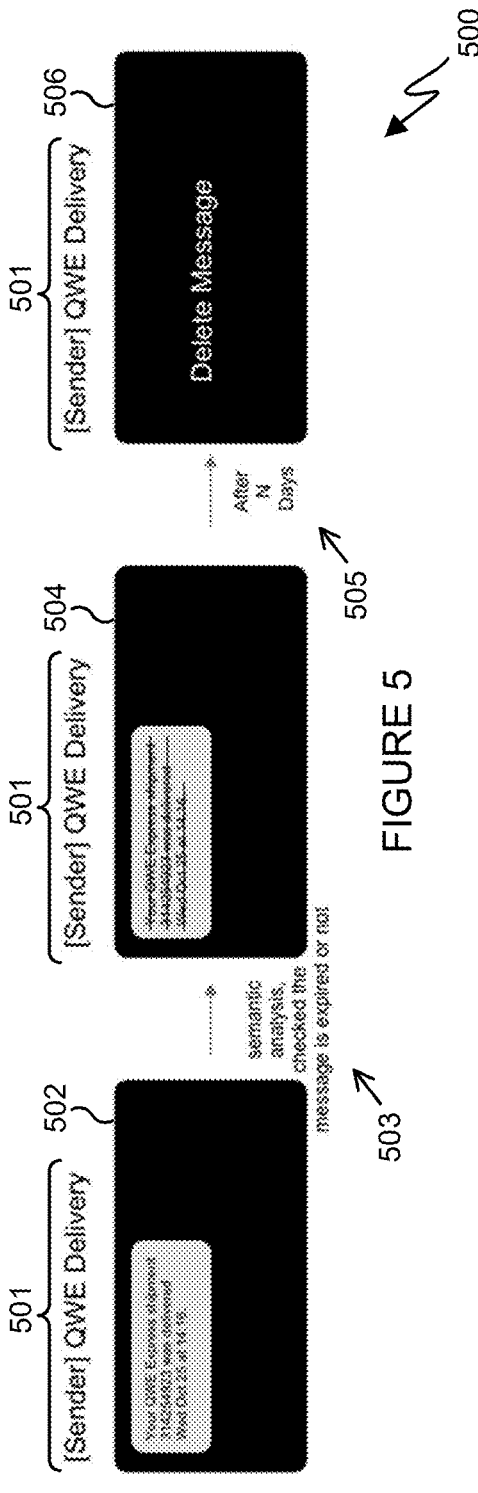
FIG. 5 is another series of user interface displays in accordance with this disclosure.

FIG. 5 is another series 500 of user interface displays illustrating results of performance by the electronic device 101 of the determinations 302, 305, 307, 309, and 312, semantic analysis 306, and actions 311 and 313 in FIGS. 3A and 3B. FIG. 5 is an example of an A2P message having no characteristics from which expiration can be inferred, but containing content with direct information regarding message expiration. In the example of FIG. 5, an A2P message (as classified by determination 302) is received with sender information 501 indicating that the message originated from a third-party app for delivery tracking, and with message content 502 including a delivery confirmation. Semantic analysis 306 is performed on the message content using semantic analysis model 202, to identify the delivery date and time (determination 307). A check 503 is then performed (within determination 309) of whether the message is expired (e.g., based on elapse of a defined period following delivery). As result, the message content 504 is displayed as crossed out. The message implicitly requires no further action by the user (determination 312), so after elapse 505 of a period of N days without action by the user, the message content 506 is moved to the trash without further action by the user.

Figure 6:
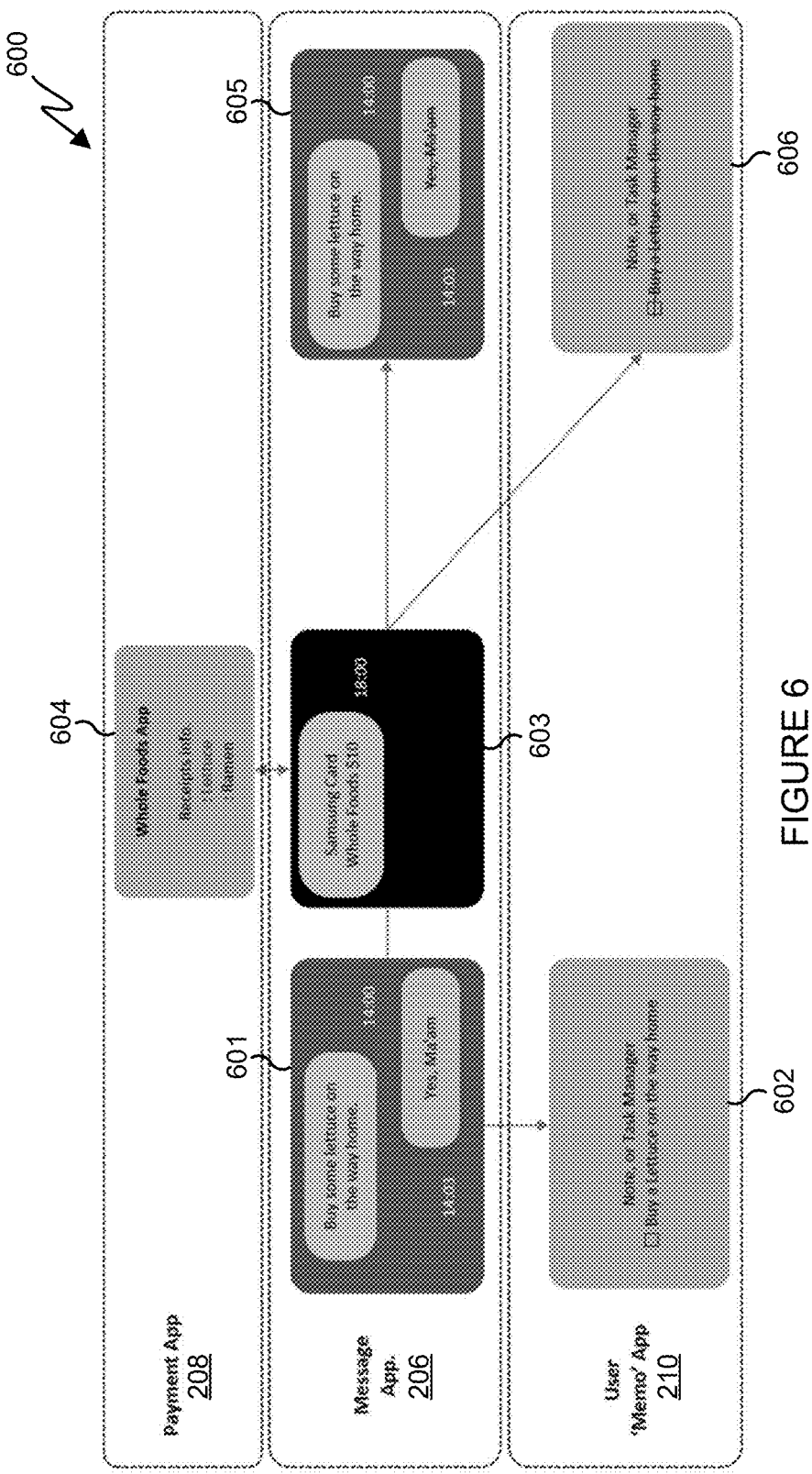
FIG. 6 is a third series of user interface displays in accordance with this disclosure.

FIG. 6 is a third series 600 of user interface displays illustrating results of performance by the electronic device 101 of the determinations 302, 305, 307, 309, and 312, semantic analysis 306, and actions 311 and 313 in FIGS. 3A and 3B. FIG. 6 illustrates use of related information 310 from other apps, specifically a payment app 208 and a memo app 210, in conjunction with messages received by the messaging app 206 and the results of semantic analysis 306 by semantic analysis model 202. In the example of FIG. 6, a P2P message 601 (as classified by determination 302) is received the messaging app 206, that contains simple or explicit actions. Semantic analysis 306 is performed on the message content, with a requested action being inferred from the words "buy" and "lettuce." As soon as the task is identified from the content of message 601, an item is created for the to-do list 602 in the memo app 210.

At a later time, the messaging app 206 receives a message 603 indicating that a payment was made. In response to the payment alert, related information 310 in the form of a receipt 604 in the payment app 208 is checked. Once "Lettuce" is found on the receipt information for items purchased, portions of the message 605 are crossed out, and the to-do list 606 is updated by also crossing out the item previously added. Based on semantic analysis of message contents, and monitoring of related apps to check whether the tasks/actions are being completed, messages will be automatically crossed out when the task is completed.

FIGS. 7A and 7B illustrate alternative user interface controls for manually deleting, protecting, or restoring messages in accordance with embodiments of the present disclosure. For messages crossed out due to determination of an implicit or explicit timeout or explicit actions, a menu that can be provided for the user to manually cross out or restore message, based on the user's judgement. For both FIGS. 7A and 7B, by an action of dragging (swipe-in) the message within the message window, a menu can be brought up. In the example of FIG. 7A, swiping the message to the left will undo the cross-out of the message, while swiping the message to the right will (manually) cross-out the message. In the example of FIG. 7B, a pop-up list of options ("Save (Protect)," "Cross Out," and "Delete") is presented for user selection.

FIG. 8 illustrates an example method 800 for message marking and deletion in accordance with this disclosure. For ease of explanation, the method 800 shown in FIG. 8 is described as being performed using the electronic device 101 in the network configuration 100 of FIG. 1. However, the method 800 could be performed using any other suitable device(s), such as the server 106, and in any other suitable system(s).

At step 802, a message is received. In various embodiments, the message is a A2P message or a P2P message. In that respect, the message includes characteristics other than content, such as origin of the message and/or association of the message with an app such as a payment app, a memo app, or a delivery tracking app. Also, in various embodiments, the message may include content including direct information regarding expiration of the message, such as a date/time or an action. Step 802 can include the processor 120 of the electronic device 101 retrieving or receiving the message in a messaging app from a messaging server.

At step 804, the message is classified as originating from a person or from an application. This can include the processor 120 of the electronic device 101 determining an origin of the message or an association of the message with an app.

At step 806, for a message originating from a person, a machine learning model is used to semantically analyze content of the message for direct information indicating a timeout for the message or an action requested in the message. This can include the processor 120 of the electronic device 101 performing the semantic analysis operation 306 of FIGS. 3A and 3B.

At step 808, when the message originated from an application, either a characteristic (other than content) of the message is used to determine an expiration of the message, or a machine learning model is used to semantically analyze content of the message for direct information indicating a timeout for the message or an action requested in the message. In various embodiments, when the message characteristic is employed, the timeout for the message may be a predefined timeout associated with the origin of the message. In various embodiments, information related to the message may be received from other app(s). This can include the processor 120 of the electronic device 101 performing the semantic analysis operation 306 of FIGS. 3A and 3B.

At step 810, if the timeout for the message has elapsed or an action corresponding to the message has been completed, the message is marked for deletion. This can include crossing out the message in the messaging app display. In various embodiments, when direct information regarding message expiration cannot be ascertained from semantic analysis of the message content, a user may be allowed to manually mark the message for deletion. In various embodiments, the message may be automatically deleted without further user action following a predetermined period after the message is marked for deletion. In various embodiments, a determination is made as to whether the user has further action to take relating to the message marked for deletion and, in response to determining that the user has further action to take, the message is not automatically deleted.

Although FIG. 8 illustrates one example of a method 800 for message marking and deletion, various changes may be made to FIG. 8. For example, while shown as a series of steps, various steps in FIG. 8 could overlap, occur in parallel, occur in a different order, or occur any number of times (including zero times).

Figure 9:
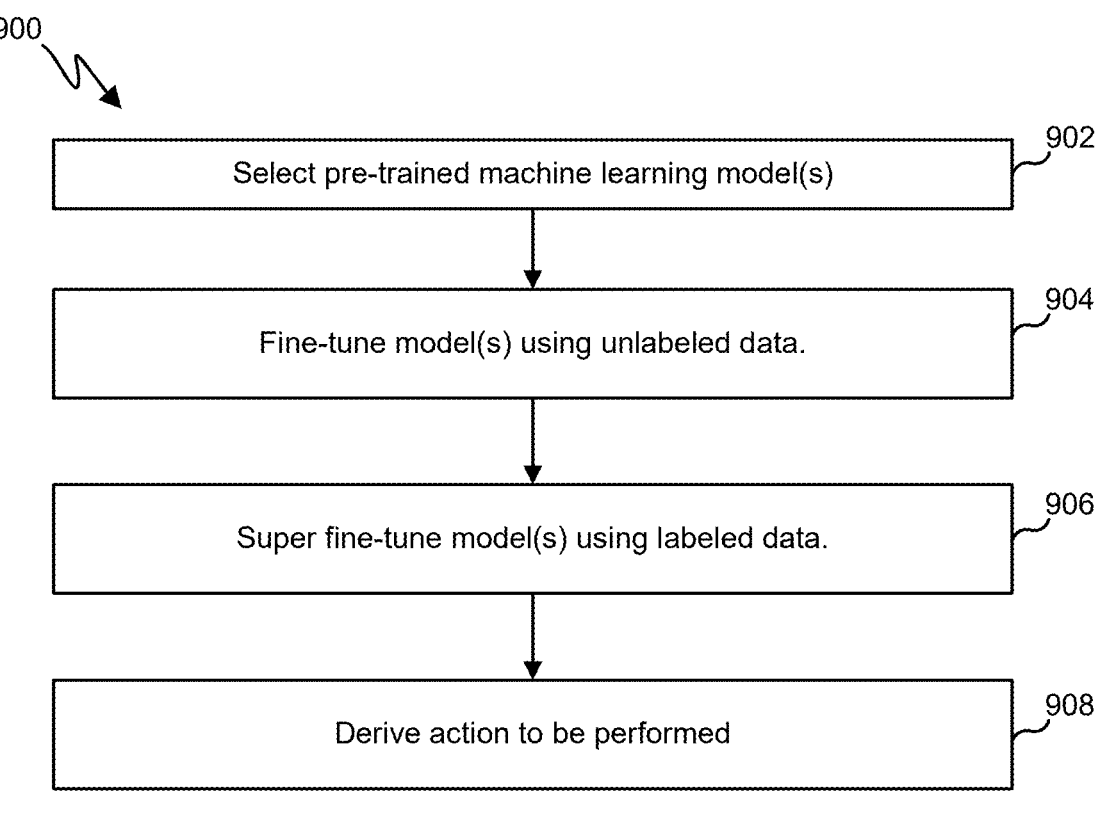
FIG. 9 illustrates an example method for selection and training of machine learning model(s) employed during message marking and deletion in accordance with this disclosure.

FIG. 9 illustrates an example method 900 for selection and training of machine learning model(s) employed during message marking and deletion in accordance with this disclosure. For ease of explanation, the method 900 shown in FIG. 9 is described as being performed using the server 106 in the network configuration 100 of FIG. 1. However, the method 900 could be performed using any other suitable device(s), and in any other suitable system(s).

At step 902, one or more pre-trained machine learning model(s) is selected. For example, one suitable model is the Bidirectional Encoder Representations from Transformer (BERT), a language transformer model that can perform semantic analysis tasks. At step 904, the selected model(s) are fine-tuned to the context use case using unlabeled data, enabling the model to perform text prediction. At this step, during the fine-tuning process, words indicative of time and/or task will be selected, e.g. "today," "urgent," "quickly," "call me," "finish," etc.

At step 906, the selected and fine-tuned model(s) are super fine-tuned using labeled data to classify text by performing Natural Language Processing (NLP) tasks such as Named Entity Recognition (NER) and/or Semantic Role Labeling (SRL). After classifying the text, at step 908, appropriate action(s) to be performed based on a received message is derived.

The corpus of data required to train the selected machine learning model(s) can be acquired from a third party or other licensed sources. Alternatively, a corpus of synthetic data relevant to the types of contexts described above may be created.

Although FIG. 9 illustrates one example of a method 900 for selection and training of machine learning model(s) employed during message marking and deletion, various changes may be made to FIG. 9. For example, while shown as a series of steps, various steps in FIG. 9 could overlap, occur in parallel, occur in a different order, or occur any number of times (including zero times).

It should be noted that the functions shown in FIG. 2 through 9 or described above can be implemented in an electronic device 101, 102, 104, server 106, or other device(s) in any suitable manner. For example, in some embodiments, at least some of the functions shown in FIGS. 2 through 9 or described above can be implemented or supported using one or more software applications or other software instructions that are executed by the processor 120 of the electronic device 101, 102, 104, server 106, or other device(s). In other embodiments, at least some of the functions shown in FIGS. 2 through 9 or described above can be implemented or supported using dedicated hardware components. In general, the functions shown in FIGS. 2 through 9 or described above can be performed using any suitable hardware or any suitable combination of hardware and software/firmware instructions. Also, the functions shown in FIGS. 2 through 9 or described above can be performed by a single device or by multiple devices. For instance, the server 106 might be used to train and/or compress the machine learning model 202, and the server 106 could deploy the trained and/or compressed machine learning model 202 to one or more other devices (such as the electronic device 101) for use.

Although this disclosure has been described with reference to various example embodiments, various changes and modifications may be suggested to one skilled in the art. It is intended that this disclosure encompass such changes and modifications as fall within the scope of the appended claims.

What is claimed is:

1. A method, comprising:
receiving, by at least one processor, a message for a user;
classifying, by the at least one processor, the message as originating from a person or from an application;
based on classifying the message as originating from an application:
determining, by the at least one processor, whether a timeout for the message is identifiable based on one or more characteristics of the message other than content of the message; and
in response to determining that the timeout for the message is not identifiable based on the one or more characteristics of the message, utilizing, by the at least one processor, a machine learning model to semantically analyze the content of the message to determine whether the timeout for the message or an action for the user is inferable from the content of the message;
based on classifying the message as originating from a person, utilizing, by the at least one processor, the machine learning model to semantically analyze the content of the message to determine whether the timeout for the message or the action for the user is inferable from the content of the message; and
responsive to determining that the timeout has elapsed or the action for the user corresponding to the message has been completed by the user, marking, by the at least one processor, the message for deletion following a predetermined period.

2. The method of claim 1, wherein marking the message for deletion following the predetermined period comprises crossing out the message.

3. The method of claim 1, wherein the one or more characteristics of the message include an origin of the message, and wherein a predefined timeout is associated with the origin of the message.

4. The method of claim 1, further comprising:
responsive to semantic analysis of the content of the message not explicitly indicating the timeout or the action, allowing the user to manually mark the message for deletion.

5. The method of claim 1, wherein the machine learning model receives, as input, app information related to the message.

6. The method of claim 1, further comprising:
deleting the message without further user action following the predetermined period.

7. The method of claim 1, further comprising:
determining that the user has further action to take relating to the message; and
responsive to determining that the user has further action to take, not deleting the message following the predetermined period.

8. An electronic device, comprising:
a transceiver configured to receive a message for a user; and
at least one processor configured to:
classify the message as originating from a person or from an application;
based on classifying the message as originating from an application:
determine whether a timeout for the message is identifiable based on one or more characteristics of the message other than content of the message;
in response to determining that the timeout for the message is not identifiable based on the one or more characteristics of the message, utilize a machine learning model to semantically analyze the content of the message to determine whether the timeout for the message or an action for the user is inferable from the content of the message;
based on classifying the message as originating from a person, utilize the machine learning model to semantically analyze the content of the message to determine whether the timeout for the message or the action for the user is inferable from the content of the message; and
responsive to determining that the timeout has elapsed or the action for the user corresponding to the message has been completed by the user, mark the message for deletion following a predetermined period.

9. The electronic device of claim 8, wherein, to mark the message for deletion following the predetermined period, at least one processor configured to cross out the message.

10. The electronic device of claim 8, wherein the one or more characteristics of the message include an origin of the message, and wherein a predefined timeout is associated with the origin of the message.

11. The electronic device of claim 8, wherein the at least one processor is further configured to:

responsive to semantic analysis of the content of the message not explicitly indicating the timeout or the action, allow the user to manually mark the message for deletion.

12. The electronic device of claim 8, wherein the machine learning model is configured to receive, as input, app information related to the message.

13. The electronic device of claim 8, wherein the at least one processor is further configured to:

delete the message without further user action following the predetermined period.

14. The electronic device of claim 8, wherein the at least one processor is further configured to:

determine that the user has further action to take relating to the message; and responsive to determining that the user has further action to take, not delete the message following the predetermined period.

15. A non-transitory machine readable medium containing instructions that when executed cause at least one processor of an electronic device to:

receive a message for a user;

classify the message as originating from a person or from an application;

based on classifying the message as originating from an application:

determine whether a timeout for the message is identifiable based on one or more characteristics of the message other than content of the message;

in response to determining that the timeout for the message is not identifiable based on the one or more characteristics of the message, utilize a machine learning model to semantically analyze the content of the message to determine whether the timeout for the message or an action for the user is inferable from the content of the message;

based on classifying the message as originating from a person, utilize the machine learning model to semantically analyze the content of the message to determine whether the timeout for the message or the action for the user is inferable from the content of the message; and responsive to determining that the timeout has elapsed or the action for the user corresponding to the message has been completed by the user, mark the message for automated deletion following a predetermined period.

16. The non-transitory machine readable medium of claim 15, wherein the instructions that when executed cause the at least one processor to mark the message for automated deletion following the predetermined period comprise:

instructions that when executed cause the at least one processor to cross out the message.

17. The non-transitory machine readable medium of claim 15, further containing instructions that when executed cause the at least one processor to:

based on classifying the message as originating from the application, check the message for the timeout; and responsive to determining that the timeout has elapsed, mark the message for automated deletion following the predetermined period.

18. The non-transitory machine readable medium of claim 15, further containing instructions that when executed cause the at least one processor to:

responsive to semantic analysis of the content of the message not explicitly indicating the timeout or the action, allow the user to manually mark the message for deletion.

19. The non-transitory machine readable medium of claim 15, wherein the machine learning model is configured to receive, as input, app information related to the message.

20. The non-transitory machine readable medium of claim 15, further containing instructions that when executed cause the at least one processor to:

delete the message following the predetermined period.

* * * * *